Sept. 12, 1939.     E. S. SEGARD     2,172,991
POWER TRANSMISSION
Filed Oct. 8, 1937     3 Sheets-Sheet 1
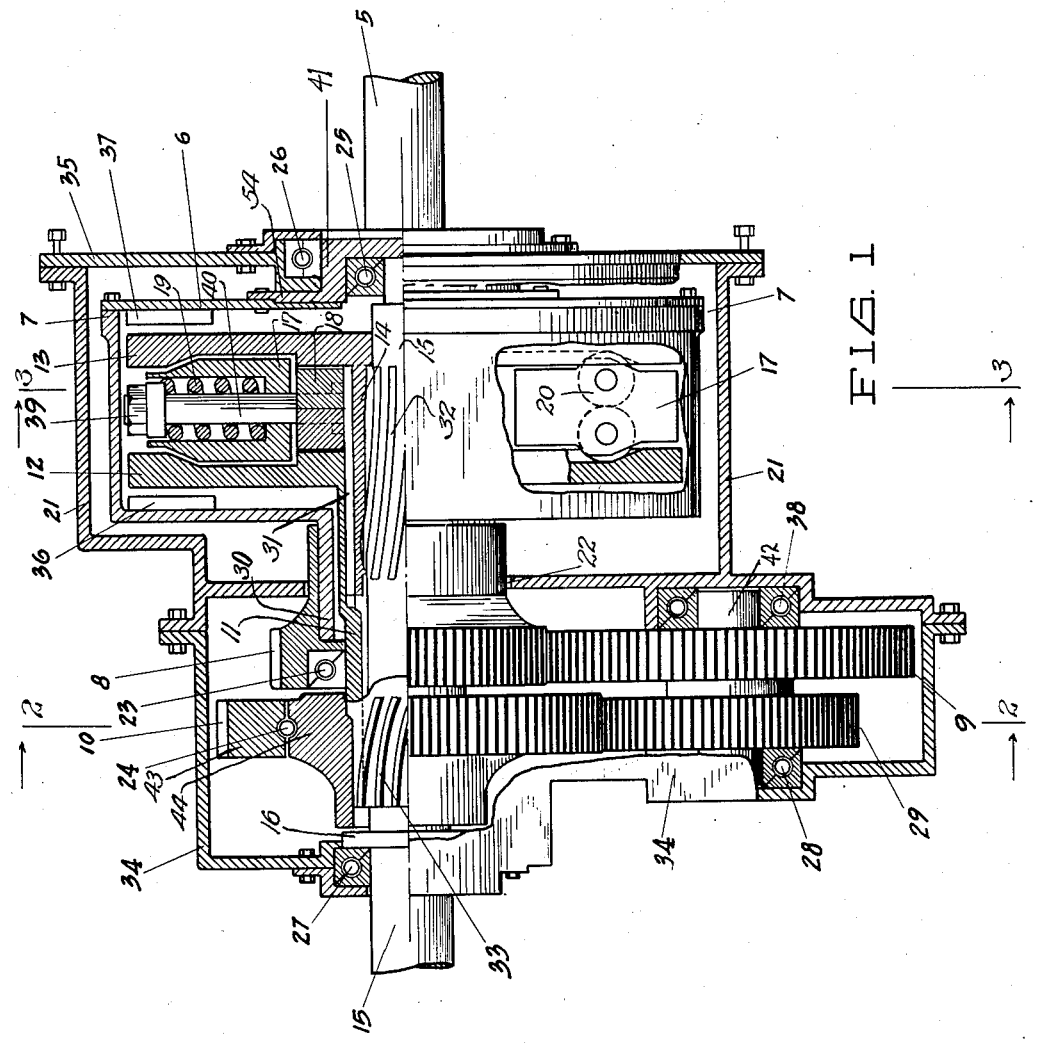
INVENTOR.
Edwin S. Segard Sept. 12, 1939.  E. S. SEGARD  2,172,991
POWER TRANSMISSION
Filed Oct. 8, 1937  3 Sheets-Sheet 2

INVENTOR.
Edwin S. Segard

Sept. 12, 1939.　　　　E. S. SEGARD　　　　2,172,991
POWER TRANSMISSION
Filed Oct. 8, 1937　　　　3 Sheets-Sheet 3

INVENTOR.
Edwin S. Segard

Patented Sept. 12, 1939

2,172,991

UNITED STATES PATENT OFFICE 2,172,991

POWER TRANSMISSION

Edwin S. Segard, San Francisco, Calif.

Application October 8, 1937, Serial No. 167,899

3 Claims. (Cl. 74—336)

This, my invention is a basically new device in that it is a basically new means of power transmission and therefore relates to no heretofore known conventional means for power transmission in that it is a device for the transmission of power, from a power source, such as an engine or motor, to a vehicle, conveyance or machine, in an uninterrupted flow through a series of speed changes or gear ratios, automatically, by virtue of the co-action of the velocity of rotation and the torque load, when the relation between the velocity of rotation and the torque load, becomes such that a change in the rate of rotation or gear ratio is necessary for the power source to operate within the limits of its economical range of velocity of rotation and torque capacity.

The primary purpose of the invention is to produce power transmission devices with constantly meshed gears through which the power, namely, the velocity of rotation and the torque, of the power source delivered to the device, flows in a constant uninterrupted stream, through a series of changes in the ratio of rotation, or gear ratio, which changes occur automatically, as if and when they are needed to permit the power source to operate within its economical range of velocity of rotation and torque capacity. In other words the primary object of my invention is the production of power transmission devices which will enable an engine, motor or other suitable power source, to transmit to the vehicle, conveyance or machine served, by means of automatic variations of gear ratio the desired velocity and torque without the power source being compelled to operate beyond its economical range, of velocity of rotation or torque capacity.

The device with which to accomplish the foregoing objects and the novel means by which this new and novel manner of power transmission is effectuated will be described fully in the specification and subjoined claims which follow.

In the drawings herewith accompanying Fig. 1 is a top plan view of my device showing portions thereof in section.

Figure 3:
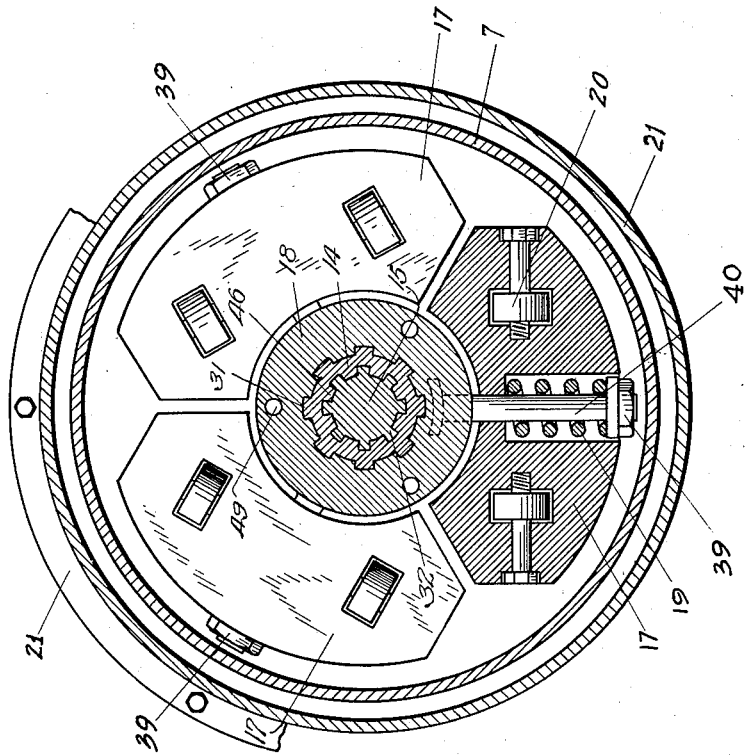
Fig. 3 is a cross-sectional view taken on the line 3—3 of Fig. 1 looking in the direction of the arrows and showing details of the centrifugal responsive torque controlled clutch means.

In the accompanying drawings, Fig. 1, for the purpose of illustration is shown a one unit, two speed, embodiment of my invention, the numeral 5 designates the driving shaft (assumed to be connected in driving relation through a proper clutch device to a power source such as an engine) which has a recessed and flanged hub 41 the outer surface of which hub rides in bearing 26 and in the recess of which, rides bearing 25 and the flange 54 of which is riveted to the forward disk 6 of the centrifugal clutch casing. The forward disk of the centrifugal clutch casing is bolted around its outer margin to the centrifugal clutch casing cup 7, which casing cup 7 is integral with tubular shaft 30 which shaft carries gear 8. Thus it is obvious that shaft 5, hub 41, disk 6, casing 7, shaft 30 and gear 8 are integral and rotate in unison at all times. Gear 8 riding on bearing 23 meshes with gear 9, which is of greater diameter than gear 8, and is integral with gear 29 and shaft 42. (They, gear 9, gear 29 and shaft 42 being cut from a single block of steel.) Gear 29 which is of less diameter than gear 9, meshes with the rim section 43 of gear 10 which gear 10 is of greater diameter than gear 29. The rim section 43 of gear 10 is connected to hub section 44 of gear 10 through the over-riding clutch, ball 24. The hub section 44 of gear 10 is carried on threads of the worm 33 on the rear end of tubular shaft 11. Tubular shaft 11 is integral with rear pressure disk 12 of the centrifugal clutch and its forward inner surface is splined, in which splined forward end is carried the outer splined surface of the rear portion of tubular shaft 14 which is integral with the forward pressure disk 13 of the centrifugal clutch. Tubular shaft 14 is splined on its outer surface from end to end and is integral with forward pressure disk 13 and has its rear end riding in the splines inside the forward end of tubular shaft 11 and has the splined hub 18 of the centrifugal governor riding on its forward end. It is free to slide forward and backward inside tubular shaft 11 but being splined into shaft 11 must rotate in unison with shaft 11. The inner surface of tubular shaft 14 being threaded similar to threads in a nut is connected to the forward end of driven shaft 15 through its worm threads 32. Driven shaft 15 passing through tubular shaft 11, which carries gear 10, has thrust shoulder 16 integral with it operating to prevent hub section 44 from slipping off the worm threads 33 of shaft 11. Driven shaft 15 at its forward end is journaled in bearing 25 and at its rear end is supported and retained in position by support and thrust bearing 27.

*Operation of the device.*—(When torque is applied and as a result the rate of rotation is progressively increased.)

Assuming that the device as shown in Fig. 1 is installed in a vehicle or machine in such manner that the engine of the vehicle or machine through a suitable clutch mechanism sets shaft 5 in rotation, which rotation shall be in counter clockwise direction, when viewed from the rear, then the device will operate in the following manner.

Figure 2:
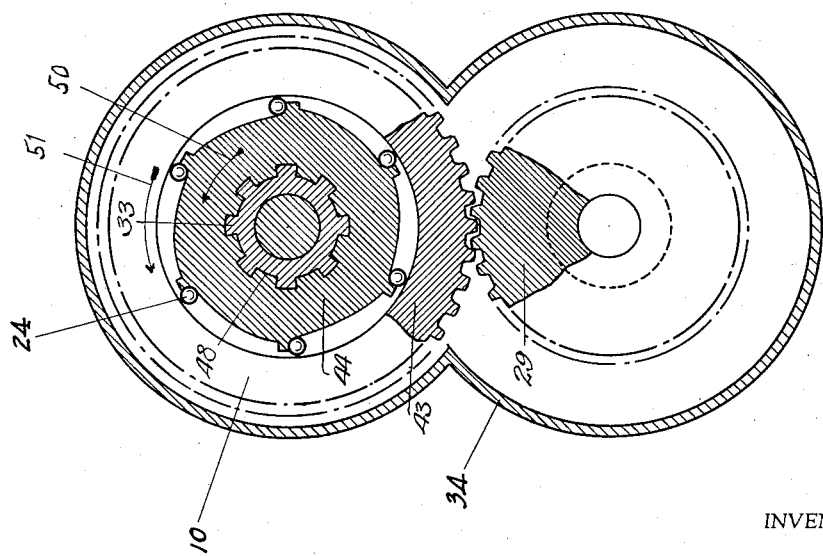
Fig. 2 is a cross-sectional view taken on line 2—2 of Fig. 1 looking in the direction of the arrows and showing the details of the gear train including the uni-directional clutch.
Figure 4:
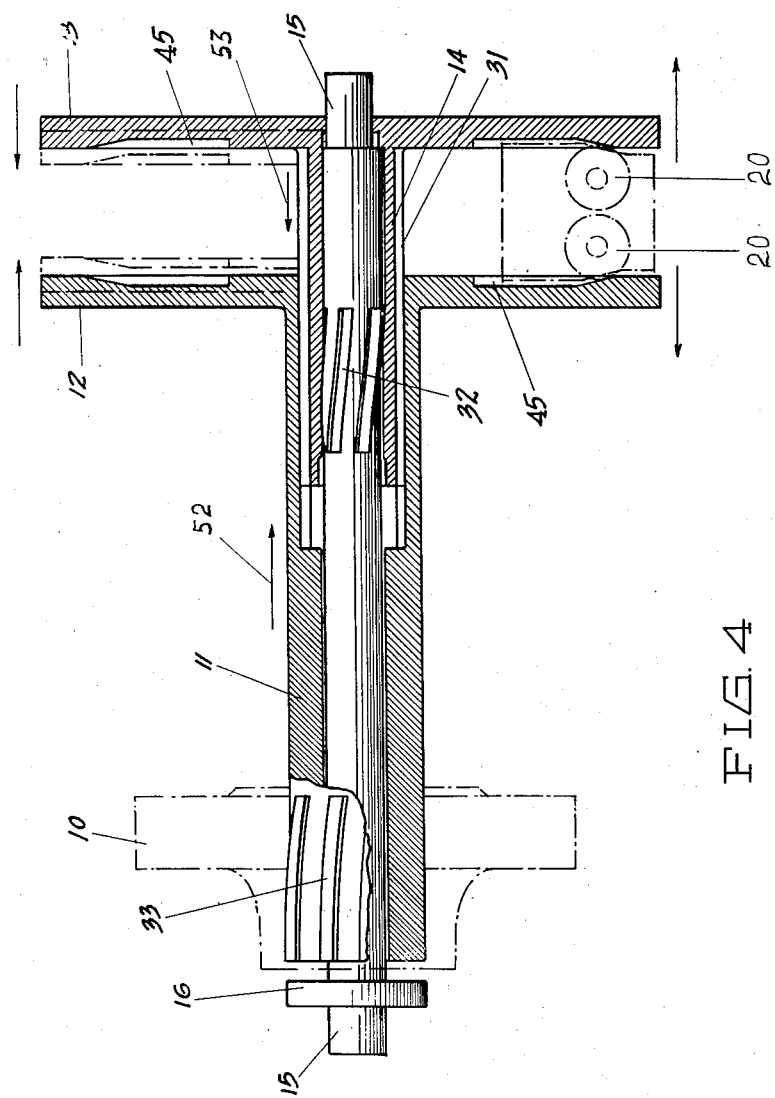
Fig. 4 is a fragmentary detail longitudinal cross-sectional view of the torque operated mechanisms.

As shaft 5 begins to rotate, the centrifugal clutch parts 6 and 7 and tubular shaft 30 with gear 8 being integral with shaft 5, rotate, causing gear 8 to rotate gear 9 in clockwise direction (viewed from the rear) gear 9 being integral with gear 29 causes gear 29 to rotate rim section 43 in counter clockwise direction (viewed from the rear). This rotation of rim section 43 causes ball 24 to be rolled up the incline of its race on the face of hub section 44 (see Fig. 2) thereby becoming grasped between rim section 43 and hub section 44 causing positive clutching action compelling hub section 44 to rotate in unison with rim section 43. Rotation in unison of rim section 43 and hub section 44 causes these two parts to function as a single unit which is designated as gear 10. Gear 10 now operating as an integral gear, the threads in its hub section transmit its rotation to tubular shaft 11 through worm threads 33. The transmittal of its rotation impulse to tubular shaft 11 causes tubular shaft 11 to slide forward in proportion to the torque required to rotate shaft 11, this because of the worm relationship or connection between the hub of gear 10 and the rear end of shaft 11 and the fact that gear 10 is prevented from sliding backwards by thrust shoulder 16 of driven shaft 15. As tubular shaft 11 is rotated it carries with it tubular shaft 14 because the rear end of the outer splined surface of tubular shaft 14 rides in the splined forward end of shaft 11. Shaft 11 in its rotation also carries with it the splined hub 18 of the centrifugal governor with its attached parts because splined hub 18 of the governor rides on the forward end of the splined outer surface of tubular shaft 14. Since rear pressure disk 12 is integral with tubular shaft 11 and forward pressure disk 13 is integral with tubular shaft 14 these disks are also rotated in unison with tubular shaft 11. The rotation of shaft 11 by gear 10 therefore results in rotation in unison of, tubular shaft 11, rear pressure disk 12, tubular shaft 14, governor hub 18 with its attached parts and forward pressure disk 13. The rotation of tubular shaft 14 transmits its rotation to driven shaft 15 through worm thread 32. This transmittal of rotation of tubular shaft 14 to driven shaft 15 causes tubular shaft 14 to slide toward the rear in proportion to the torque required to rotate driven shaft 15 because of the worm relationship between the inner surface of tubular shaft 14 and the worm threaded forward end of driven shaft 15 and because driven shaft 15 is prevented from sliding forward by its thrust shoulder 16 operating against the hub of gear 10. Due to the fact that gear 10 is prevented from sliding backward by thrust shoulder 16 and driven shaft 15 is prevented from sliding forward by the same thrust shoulder 16 and the fact that the pitch of the worm relationship between the hub of gear 10 and shaft 11 is the same as the pitch of the worm relationship between the inner surface of tubular shaft 14 and the forward end of driven shaft 15, tubular shaft 11 is forced forward and tubular shaft 14 is forced backward with equal force, and that force is directly proportional to the torque required to rotate driven shaft 15. Because as stated above pressure disk 12 is integral with tubular shaft 11 and pressure disk 13 is integral with tubular shaft 14 the pressure disk 12 and pressure disk 13 are forced towards each other in direct proportion to the torque required to rotate driven shaft 15. Since the centrifugal governor hub 18 with its attached parts rotates with and is mounted between pressure disks 12 and 13 the governor weights 17 due to their inclined plane race 45 relationship (through their rollers) with pressure disks 12 and 13 will be urged towards the axis of rotation with a force which is directly proportional to the torque required to rotate driven shaft 15.

When the rate of rotation of driving shaft 5 reaches a level at which it is capable despite the reducing effect of the gear train, gear 8 and gear 9 together with gear 29 and gear 10, of imparting to tubular shaft 11 a sufficient rate of rotation to develop centrifugal force of sufficient magnitude to urge the weights 17 outward from the axis of their rotation sufficiently to cause them to compress springs 19 and to exert (through their rollers 20 acting against the incline of grooved race 45 on the inner face of pressure disks 12 and 13) a force that more than equals the force with which the torque required to rotate driven shaft 15 is causing the pressure disks 12 and 13 to be urged towards each other then pressure disks 12 and 13 are pushed apart (by rollers 20) and forced into contact with friction disks 36 and 37 respectively. Immediately pressure disks 12 and 13 contact friction surfaces 36 and 37 respectively, pressure disks 12 and 13 tend to be carried along with friction surfaces 36 and 37 which are revolving integral with driving shaft 5. Pressure disks 12 and 13 being thus carried along and urged to rotate in unison with driving shaft 5, causes torque to be transmitted directly from pressure disks 12 and 13 to driven shaft 15 which torque immediately reduces the amount of torque applied to tubular shaft 11 by gear 10. This reduction in torque applied to shaft 11 decreases correspondingly the force with which pressure disks 12 and 13 are being urged toward each other. Reduction in the force urging pressure disks 12 and 13 towards each other increases in consequence simultaneously the pressure, of pressure disks 12 and 13 against friction surfaces 36 and 37 respectively, with the result that motion between these parts is stopped. This stoppage of motion between pressure disks 12 and 13 and friction surfaces 36 and 37 results in pressure disks 12 and 13 causing tubular shafts 14 and 11 and hub section 44 and driven shaft 15 to come to rotate in unison with shaft 5 by virtue of the driving relation between pressure disks 12 and 13 of tubular shafts 11 and 14, with hub section 44 and driven shaft 15. From the beginning of the pressure disks 12 and 13 becoming urged to rotate in unison with friction surfaces 36 and 37 (and therefore with driving shaft 5) as just described above the hub section 44 of gear 10 being in integral driving relation through thread 33 with tubular shaft 11 begins to rotate at a speed greater than that of the rim section 43 of gear 10. At the instant the hub section 44 begins to rotate faster than rim section 43 the balls 24 are thereby rolled down the incline of their race on hub section 44 thereby releasing their clutch action between rim section 43 and hub section 44, which release causes gear 10 to cease to transmit torque through tubular shaft 11 but there is not in consequence of this any change in the amount of force by which the torque required to rotate driven shaft 15 is urging pressure disks 12 and 13 towards each other. Following the release of the clutch action between rim section 43 and hub section 44 as above described, driving shaft 5 and driven shaft 15 rotate in unison and the gears 8, 9 and 29 and the rim section 43 cease to transmit torque and merely rotate at speeds commensurate with their gear ratios and the speed of rotation of gear 8 and driving shaft 5.

Driving shaft 5 having been increased in its speed of rotation up to the point of completion of the above described phenomena further increase in its rate of rotation produces no further phenomena except an increase of the pressure exerted upon pressure disks 12 and 13 by the centrifugal weights 17 which increases proportionately the clutching pressure between disks 12 and 13 and friction surfaces 36 and 37, which increase in pressure is directly proportional to the increase in the rate of rotation.

*Operation of the device.* (When the rate of rotation is decreased due to increase in torque load carried by driven shaft.)

When driving shaft 5 after having reached a rate of rotation sufficient to have caused the phenomena above described is decreased in its rate of rotation by virtue of the torque load carried by driven shaft 15 having slowed down the rate of rotation of the power source to a point where the pressure exerted on pressure disks 12 and 13 by the centrifugal force of governor weights 17 is insufficient to oppose the torque inspired force urging pressure disks 12 and 13 toward each other and to prevent motion between pressure disks 12 and 13 and friction surfaces 36 and 37 respectively, this lack of pressure causes slipping between them and as a result driven shaft 15 will begin to rotate slower than driving shaft 5 which immediately causes driving shaft 5 through gears 8, 9 and 29 to rotate rim section 43 faster than hub section 44. This causes balls 24 to be rolled up the incline of their race on the face of hub section 44 causing clutching action between rim section 43 and 44 which clutching action causes rim section 43 and 44 to again come to operate integrally as gear 10 which causes the torque of driving shaft 5 to be again transmitted through gears 8, 9, 29 and gear 10 to tubular shaft 11 through its worm connection with hub section 44 of gear 10, causing tubular shaft 11 to again transmit torque causing pressure disk 12 to again be forced toward pressure disk 13 by a force directly proportional to the torque required to rotate driven shaft 15 in the manner and for the reasons already described above. This resumption of torque transmittal by tubular shaft 11 continuing the force urging disks 12 and 13 towards each other tends to force pressure rollers 20 down the inclined plane of their race 45 on the inner face of disks 12 and 13 thus aiding release springs 19 in forcing governor weights towards the axis of rotation thereby accomplishing the release of the clutch action between pressure disks 12 and 13 and friction surfaces 36 and 37. With the release of this clutch action between disks 12 and 13 and friction surfaces 36 and 37 respectively driving shaft 5 rotates at a rate greater than that of driven shaft 15 in accordance with the gear ratios of the gear train, (comprising gears 8, 9, 29 and 10) through which the torque is transmitted. This ratio of rotation between driving shaft 5 and driven shaft 15 continues to obtain as long as the power source is incapable of increasing the rate of rotation of driven shaft 15 up to the point of causing the phenomena described in the preceding paragraph to be inaugurated. In like manner this ratio of rotation between driving shaft 5 and driven shaft 15 continues, if instead of increasing the rate of rotation of driven shaft 15 to the point of causing the phenomena described in the preceding paragraph, the torque of the power source be gradually decreased so as to cause a deceleration of driving shaft 5 commensurate with the deceleration of driven shaft 15, or if the torque load on driven shaft 15 be increased sufficiently to cause the power source to be incapable of continuing rotation of driving shaft 5 the device being thereby brought to a stop.

*Operation of the device.* (When the rate of rotation is decreased by virtue of sudden or relatively rapid progressive decrease of the torque or reversal in direction of the torque of the power source.)

When, while driving shaft 5 having reached a rate of rotation sufficient to cause driven shaft 15 with its torque load to come to rotate in unison with driving shaft 5, as above described, the torque of the power source applied to shaft 5 is suddenly removed or rapidly progressively decreased so as to cause the power source to apply a degree of torque in reverse direction (clockwise as viewed from the rear, Fig. 1) from that which the driving shaft is normally rotated by the power source (namely hold back action due to such factors as for example, compression of the engine used as a power source) driving shaft 5 being urged to decrease its rate of rotation and being integral with the centrifugal clutch casing, urges pressure disks 12 and 13 to decrease their rate of rotation by virtue of their being applied to friction surfaces 36 and 37 respectively with sufficient pressure to rotate in unison with the centrifugal clutch casing. This urge to decrease the rate of rotation imparted to pressure disks 12 and 13 is transmitted to driven shaft 15 through the worm connection between tubular shaft 14 and driven shaft 15. This urge to decrease the rate of rotation thus transmitted to driven shaft 15 causes pressure disk 13 to be urged against friction surface 37 by virtue of the pitch and direction of the worm connection between tubular shaft 14 and driven shaft 15. The force of this urging of pressure disk 13 against friction surface 37 is directly proportional to the torque urging shaft 5 to decrease its rate of rotation, and the momentum urging driven shaft 15 to maintain its rate of rotation. When the urge to decrease its rate of rotation applied to the driving shaft 5 by the above described reversal in direction of torque of the power source becomes of sufficient magnitude to cause sufficient decrease in the rate of rotation of driving shaft 5 and the centrifugal clutch casing integral with driving shaft 5 to cause the centrifugal force applied to centrifugal governor weights 17 to be inadequate to maintain compression of release springs 19 and exert sufficient pressure through rollers 20 against pressure disks 12 and 13 to, with the aid of the reversed torque inspired pressure of disk 13 against friction surface 37, to maintain cessation of motion between pressure disks 12 and 13 and friction surfaces 36 and 37 respectively the centrifugal clutch will begin to slip and the urge to decrease rotation transmitted to driven shaft 15 through the worm connection between tubular shaft 14 and driven shaft 15 will begin to decrease, thus gradually removing the reversed torque inspired pressure of disk 13 against friction surface 37, with the result that there is insufficient pressure remaining on friction surfaces 36 and 37 to enable driving shaft 5 to continue to urge pressure disks 12 and 13 to decrease their rate of rotation. With the cessation of driving shaft 5 urging pressure plates 12 and 13 to decrease their rate of rotation, the torque of driving shaft 5 continuing in reverse, rim section 43 being in driven relation with shaft 5 continues to be urged to decrease its rate of rotation while hub section 44 in integral relation with pressure plates 12 and 13 is no longer urged by them to decrease its rate of rotation. The rim section 43 therefore begins to rotate at an even slower rate relative to hub section 44 than it did when driving shaft 5 and driven shaft 15 were rotating in unison. As a result balls 24 remain in their position of release in their race on the face of hub section 44. The balls 24 remaining in their position of release permits, driven shaft 15, and all the parts in integral rotation relation with it, to continue to rotate at the rate, the momentum urging driven shaft 15 to rotate is capable of maintaining.

When at any time during the occurrence of any of the phenomena of operation just above described the reversed (or hold back) torque be removed from driving shaft 5 and driving torque (counterclockwise directional torque viewed from the rear Fig. 1) be re-applied to shaft 5, the just above described phenomena of operation are at once stopped, and the device comes to operate in the manner previously described for; "when torque is applied to driving shaft 5 in counter-clockwise direction when viewed from the rear (Fig. 1) and the rate of rotation progressively increased."

With the description of the device and its operation thus complete, it should be noted that while the device as illustrated and described is uni-directional in its operation, whatever the direction in which operation is desired, it is obtainable by merely reversing the structure of the uni-directional parts without any departure from, either the scope or spirit of the invention.

It should be further noted that reversal of the operation of the automatic gear and clutch means together with a reversal of the diameter measurements of the gears will result in a power transmission of the acceleration type instead of one of the reduction type, as above described. Therefore the invention is rightfully not only the invention of an automatic reduction gear power transmission as described; but also of an acceleration (or so called over drive) automatic power transmission as well. However for the sake of clarity a separate application and separate claims will be submitted on the acceleration type of the invention at a later date. It is mentioned here because the acceleration type of the invention may properly be claimed and constructed without any departure from either the scope or the spirit of this invention.

It now being obvious from the foregoing that this, my invention, is a new power transmission device with constantly meshed gears and constant power flow, which automatically changes the ratio of rotation as if, and when, such change becomes necessary to enable the power source to operate within its economical range of velocity of rotation and torque capacities, which change in the ratio of rotation is accomplished by the coaction of the centrifugal and torque forces obtaining at the moment of the need for such changes in the ratio of rotation, I claim:

1. In a mechanical device the combination of, a driving shaft means, a clutch casing means integral in axial alignment with the said driving shaft, a tubular shaft integral in axial alignment with the said clutch casing means, a plurality of tubular shafts and a driven shaft means concentric and coaxially aligned in axial alignment with the said driving shaft, a reduction gear train comprising, a driving gear, a dumbbell gear mounted on a countershaft means, and a driven gear including a uni-directional clutch means, means for connecting the said driving shaft in driving relation with the said reduction gear train through the clutch casing means and tubular shaft integral with the said driving shaft, torque responsive means for connecting the said gear train in driving relation with the plurality of tubular shafts, means for connecting the plurality of tubular shafts in driving relation with each other, torque responsive means for connecting the plurality of tubular shafts in driving relation with the said driven shaft, mounted on the means for connecting the plurality of tubular shafts in driving relation with each other, in the aforesaid clutch casing means, a velocity responsive torque controlled means for automatically effecting direct drive or reduced drive or low speed connection between the said driving and driven shafts, and an encasing and support means.

2. In a mechanical device the combination of, a driving shaft means, a clutch casing means, concentric with and co-axially aligned with the said driving shaft means its forward end integral with the rear end of the said driving shaft means, a concentric tubular shaft its forward end integral with the rear end of the said clutch casing means in co-axial alignment, a driving gear means mounted integrally on the rear end of the said tubular shaft, a dumbbell gear means mounted on a countershaft means, a driven gear means, and a uni-directional clutch means, said driving gear, dumbbell gear, driven gear and uni-directional clutch means inter-connected so as to constitute a reduction gear train including a uni-directional clutch means, the said driven gear of which is mounted at the rear end of the aforesaid tubular shaft in axial alignment on a coaxially aligned tubular shaft rotatably and slideably mounted in the aforesaid tubular shaft and protruding there-through into the aforesaid clutch casing means connecting the said driven gear by torque responsive means to a velocity responsive torque opposed balanced and controlled clutch means mounted co-axially in the aforesaid clutch casing means, a driven shaft means protruding through and rotatably mounted in the said driven gear and tubular shaft connecting the said driven gear to the said velocity responsive torque controlled clutch means and protruding through the said velocity responsive torque controlled clutch means and connected there-to by torque responsive means its forward end extending into and journaled in a bearing axially recessed in the forward wall of the aforesaid clutch casing means, a thrust shoulder means integral with the said driven shaft at and opposed to the rear surface of the aforesaid driven gear, and an encasing and support means.

3. In a mechanical device the combination comprising, a driving shaft, a clutch casing means containing attached friction means on its inner forward and rear surfaces said casing in axial alignment with and integrally mounted on the rear end of the said driving shaft, a tubular shaft axially aligned and concentric with the said driving shaft and integral with the rear end of the afore-said clutch casing means, a relatively small driving gear integrally mounted on the rear end of the said tubular shaft, a pair of countershaft gears one relatively large and the other relatively small constructed integrally the larger meshing with the aforesaid driving gear, a countershaft carrying the said countershaft gears, a relatively large driven gear containing a unidirectional clutch means which driven gear meshes with the smaller of the aforesaid countershaft gears, a tubular shaft on the rear end of which by torque responsive means is mounted the said driven gear and on the forward end of which is mounted integrally a disk and the inside of which forward disk carrying end is splined the said tubular shaft rotatably and slidably mounted in axial alignment in the aforesaid tubular shaft with its forward disk carrying end inside the aforesaid clutch casing means and with its driven gear carrying rear end protruding from the rear end of the aforesaid tubular shaft, a relatively short tubular shaft in the aforesaid clutch casing means having splines on its outer surface and having a disk mounted integrally on its forward end its rear end slidably mounted in splines in the forward disk carrying end of the tubular shaft which is rotatably and slidably mounted in axial alignment in the aforesaid tubular shaft and clutch casing means integral therewith, a hub splined and slidably mounted on the outer splined surface of the said relatively short tubular shaft between the two aforesaid disks inside the aforesaid clutch casing means, a velocity responsive torque controlled pressure applying means mounted on spokes integrally mounted radially in the said splined and slidably mounted hub between the said disks inside the aforesaid clutch casing means, a driven shaft rotatably mounted in axial alignment with and extending through the aforesaid driven gear and disk carrying tubular shaft and through the aforesaid relatively short tubular splined disk carrying shaft to the forward end of the aforesaid clutch casing means where it is journaled in a bearing recessed therein in axial alignment, a thrust shoulder means integral with the said driven shaft at a point slightly to the rear of the rear end of the driven gear and disk carrying tubular shaft in which the said driven shaft is rotatably mounted, a torque responsive means connecting in driving relation the aforesaid relatively short disk carrying tubular shaft mounted inside the aforesaid clutch casing means with the forward end of the said driven shaft, an encasing and support means, support and thrust bearing means supporting and maintaining in axial alignment the driving shaft, the plurality of tubular shafts and the driven shaft, and bearing means for support and alignment of the countershaft and countershaft gear means in the said encasing and support means.

EDWIN S. SEGARD.